(12) United States Patent
Fitzer et al.

(10) Patent No.: US 10,897,408 B2
(45) Date of Patent: *Jan. 19, 2021

(54) APPLICATION SERVER PROGRAMMING LANGUAGE RUNNING IN VSYSTEM

(71) Applicant: SAP SE, Walldorf (DE)

(72) Inventors: Joachim Fitzer, Schriesheim (DE); Pietro Francesco Menna, Sao Leopoldo (BR); Felipe Musse, Porto Alegre (BR); Simon Seif, Ostringen (DE)

(73) Assignee: SAP SE, Walldorf (DE)

( * ) Notice: Subject to any disclaimer, the term of this patent is extended or adjusted under 35 U.S.C. 154(b) by 1 day.

This patent is subject to a terminal disclaimer.

(21) Appl. No.: 16/220,802

(22) Filed: Dec. 14, 2018

(65) Prior Publication Data

US 2020/0195525 A1   Jun. 18, 2020

(51) Int. Cl.
*H04L 12/24* (2006.01)
*G06F 9/50* (2006.01)
*H04L 29/08* (2006.01)
*G06F 9/455* (2018.01)

(52) U.S. Cl.
CPC ...... *H04L 41/5048* (2013.01); *G06F 9/45558* (2013.01); *G06F 9/5072* (2013.01); *G06F 9/5077* (2013.01); *H04L 41/5051* (2013.01); *H04L 41/5054* (2013.01); *H04L 67/16* (2013.01); *H04L 67/32* (2013.01); *H04L 67/34* (2013.01); *G06F 2009/45562* (2013.01); *H04L 67/10* (2013.01)

(58) Field of Classification Search
CPC ............. H04L 41/5048; H04L 41/5051; H04L 41/5054; H04L 67/10; H04L 67/16; H04L 67/32; H04L 67/34; H04L 12/4641; H04L 12/4633; H04L 2209/42; H04L 41/0893; H04L 41/5019; H04L 47/2475; H04L 9/3213; G06F 9/5072; G06F 9/5077; G06F 9/45558; G06F 2009/45562; G06F 9/542; G06F 21/62; G06F 11/3072; H04W 28/0215; H04W 8/18

See application file for complete search history.

(56) References Cited

U.S. PATENT DOCUMENTS

| | | | |
|---|---|---|---|
| 10,013,189 B1 * | 7/2018 | Yang | G06F 3/0619 |
| 10,594,582 B2 | 3/2020 | Joshi et al. | |
| 2007/0143398 A1 * | 6/2007 | Graham | G06Q 40/02 709/204 |
| 2011/0125821 A1 * | 5/2011 | Roshen | G06F 9/541 709/201 |

(Continued)

OTHER PUBLICATIONS

U.S. Appl. No. 16/216,602, filed Dec. 11, 2018, Kubernetes as a Distributed Operating System for Multitenancy/Multiuser.

(Continued)

*Primary Examiner* — Ninos Donabed
(74) *Attorney, Agent, or Firm* — Schwegman Lundberg & Woessner, P.A.

(57) ABSTRACT

In an example embodiment, an application server is run as its own vsystem application, within a vsystem architecture. The application server contains a vRep instance and its own top layer, which is unique to each user. The application server supports exposing programs executed inside of it in many different communication formats.

17 Claims, 14 Drawing Sheets

(56) References Cited

U.S. PATENT DOCUMENTS

| | | | |
|---|---|---|---|
| 2014/0130036 A1 | 5/2014 | Gurikar et al. | |
| 2015/0051930 A1 | 2/2015 | Yamaguchi et al. | |
| 2015/0142878 A1* | 5/2015 | Hebert | G06F 9/4843 709/203 |
| 2016/0112497 A1 | 4/2016 | Koushik et al. | |
| 2017/0111241 A1 | 4/2017 | Degioanni | |
| 2018/0152534 A1 | 5/2018 | Kristiansson et al. | |
| 2018/0247064 A1* | 8/2018 | Aronovich | G06F 21/6209 |
| 2018/0367528 A1* | 12/2018 | Schwarz | H04L 63/08 |
| 2019/0065323 A1 | 2/2019 | Dhamdhere et al. | |
| 2019/0190771 A1* | 6/2019 | Fang | H04L 41/0266 |
| 2019/0324786 A1* | 10/2019 | Ranjan | G06F 9/4856 |
| 2019/0356661 A1* | 11/2019 | Hecht | H04L 9/0891 |
| 2020/0076685 A1 | 3/2020 | Vaidya et al. | |
| 2020/0186443 A1 | 6/2020 | Fitzer et al. | |
| 2020/0186616 A1 | 6/2020 | Fitzer et al. | |

OTHER PUBLICATIONS

U.S. Appl. No. 16/214,581, filed Dec. 10, 2018, Scalable Infrastructure for Developing, Running, and Deploying Arbitrary Applications.

"U.S. Appl. No. 16/214,581, Non Final Office Action dated Apr. 1, 2020", 5 pgs.

"U.S. Appl. No. 16/214,581, Notice of Allowance dated May 12, 2020", 7 pgs.

"U.S. Appl. No. 16/214,581, Response filed Apr. 28, 2020 to Non Final Office Action dated Apr. 1, 2020", 18 pgs.

"Kubernetes", Wikipedia, [Online]. Retrieved from the Internet: <URL:https://en.wikipedia.org/w/index.php?title=Kubernetes&oldid=872771944>, (Dec. 9, 2018), 11 pgs.

* cited by examiner

APPLICATION SERVER PROGRAMMING LANGUAGE RUNNING IN VSYSTEM

TECHNICAL FIELD

The subject matter disclosed herein generally relates to application server programming languages, such as ABAP. Specifically, the present disclosure addresses systems and methods to provide an application server programming language application server running in a virtual system (vsystem).

BACKGROUND

Kubernetes is a system for automating deployment, scaling, and management of containerized applications. Application containerization is a virtualization method used by operating systems to deploy and run distributed applications without launching an entire virtual machine for each application.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

One solution to this problem is to run each application in a virtual machine that only has the operating system and the application installed. This ensures that different applications will not cause problems for each other. However, virtual machines have substantial overhead associated with them. As a result, to achieve the same performance as with a standard, non-virtual, deployment, additional or higher-performing computing hardware will be required, increasing costs.

Kubernetes provides another solution in the form of containerized applications. Each container comprises an application and its libraries, but the containers are installed and managed with much less overhead than virtual machines.

Traditionally software is written to be deployed on special target platforms and environments (e.g., a Linux operating system with particular machines installed on-premises). Modernly, however, this type of software deployment has changed. Specifically, cloud deployments of applications have become more popular, where an application is installed on cloud servers, and users access the cloud servers to access and run the application as a service. This creates a challenge when it comes to scalability, however. When an application is launched, there may only be ten users operating it, but within a short amount of time that number can increase to thousands of users. Additionally, there may be some periods during which a large number of users access the application while at other times a smaller number of users access the application, creating wild swings in usage, even within a single day.

Furthermore, often the software itself is so complex that it is developed by several companies using hundreds of developers. This can make it challenging to provide patches of the applications, as well as customizations, extensions, and other modifications.

ABAP, or Advanced Business Application Programming, is a programming language created by SAP SE, of Walldorf, Germany. It is used for programming application servers. ABAP programs run inside a database. They are not stored in separate external files like Java or C++ programs. In the database, the ABAP code exists as source code and generated code. ABAP programs execute under the control of a runtime system, which is responsible for processing ABAP statements, controlling the flow logic of screens, and responding to events such as user interactions. A database interface turns database-independent ABAP statements into statements understood by the underlying database management system (DBMS).

There is currently no mechanism, however, to communicate between application server programming languages and virtual system applications.

BRIEF DESCRIPTION OF THE DRAWINGS

Some embodiments are illustrated by way of example and not limitation in the figures of the accompanying drawings.

DETAILED DESCRIPTION

Example methods and systems are directed to providing an abstraction layer to deployed applications, so that the applications can concentrate on building their domain-specific functionality and not have to worry about scalability. In an example embodiment, an ABAP application is run as a service within a vsystem as an application per tenant, or "tenant app." This provides a mechanism to communicate between ABAP applications and vsystem applications, where no such capability was provided previously.

Figure 1:
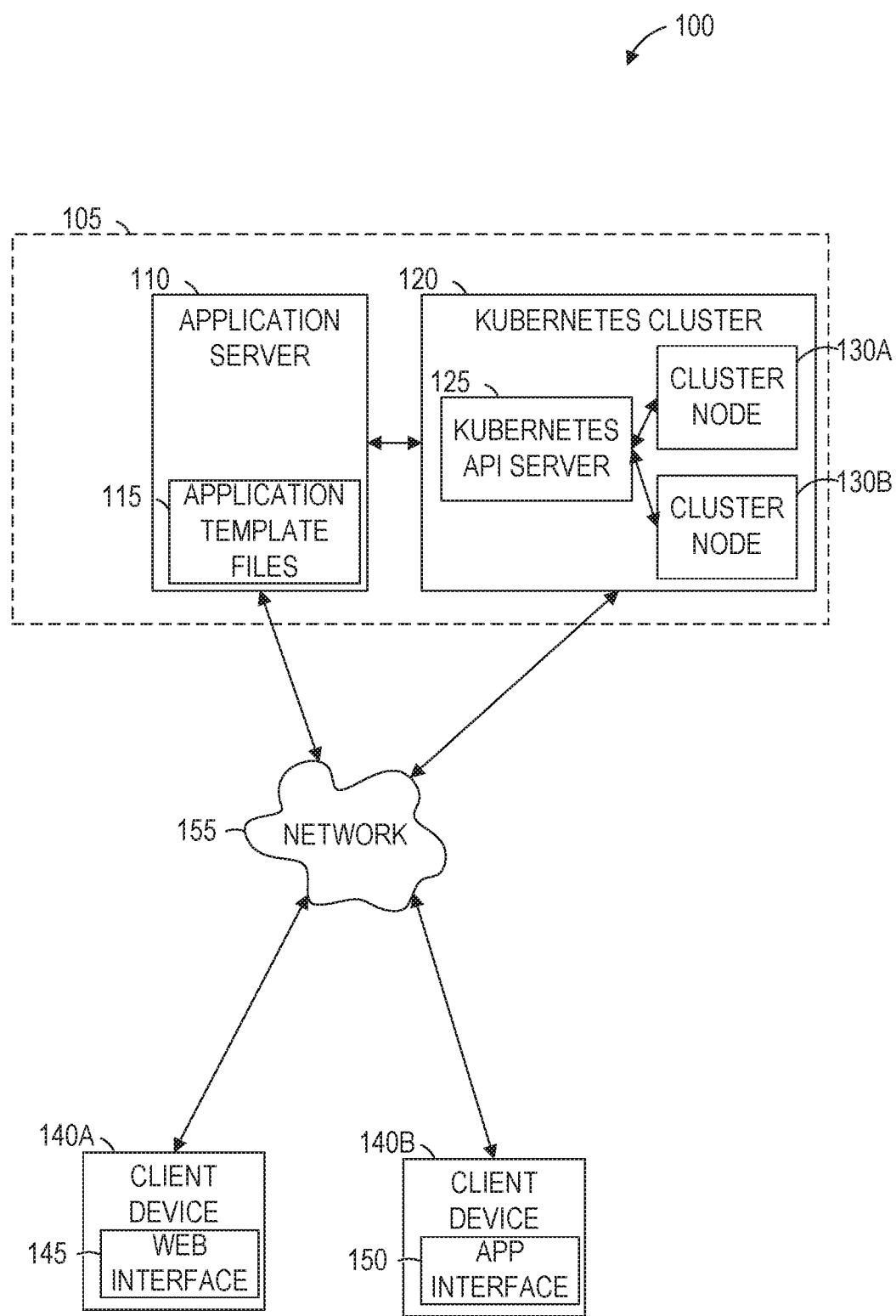
FIG. 1 is a network diagram illustrating a network environment suitable for using Kubernetes as a distributed operating system for a scalable application system, according to some example embodiments.

FIG. 1 is a network diagram illustrating a network environment 100 suitable for using Kubernetes as a distributed operating system for a scalable application system, according to some example embodiments. The network environment 100 includes a network-based application 105, client devices 140A and 140B, and a network 155. The network-based application 105 is provided by an application server 110 in communication with a Kubernetes cluster 120. The application server 110 accesses application template files 115 to configure and deploy an application to the Kubernetes cluster 120 via a Kubernetes application programming interface (API) server 125 interacting with a set of cluster nodes 130A, 130B. The containerized application is provided to the client devices 140A and 140B via a web interface 145 or an application interface 150. The application server 110, the Kubernetes API server 125, the cluster nodes 130A and 130B, and the client devices 140A and 140B may each be implemented in a computer system, in whole or in part, as described below with respect to FIG. 14. The cluster nodes 130A and 130B may be referred to collectively as the cluster nodes 130 or generically as a cluster node 130. The client devices 140A and 140B may be referred to collectively as client devices 140 or generically as a client device 140.

The application server 110 provides a user interface for selecting an application to the client devices 140. The Kubernetes API server 125 provides an interface to the Kubernetes cluster 120 and deploys applications to the cluster nodes 130. The selected application may be invoked via a virtual system application. The client device 140 may provide identifying information to the application server 110, and the identifying information may be used by the Kubernetes API server 125 or the virtual system application to determine a particular instance of the selected application to invoke.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 14. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110, the Kubernetes API server 125, the cluster nodes 130A-130B, and the client devices 140A-140B may be connected by the network 155. The network 155 may be any network that enables communication between or among machines, databases, and devices. Accordingly, the network 155 may be a wired network, a wireless network (e.g., a mobile or cellular network), or any suitable combination thereof. The network 155 may include one or more portions that constitute a private network, a public network (e.g., the Internet), or any suitable combination thereof.

Figure 2:
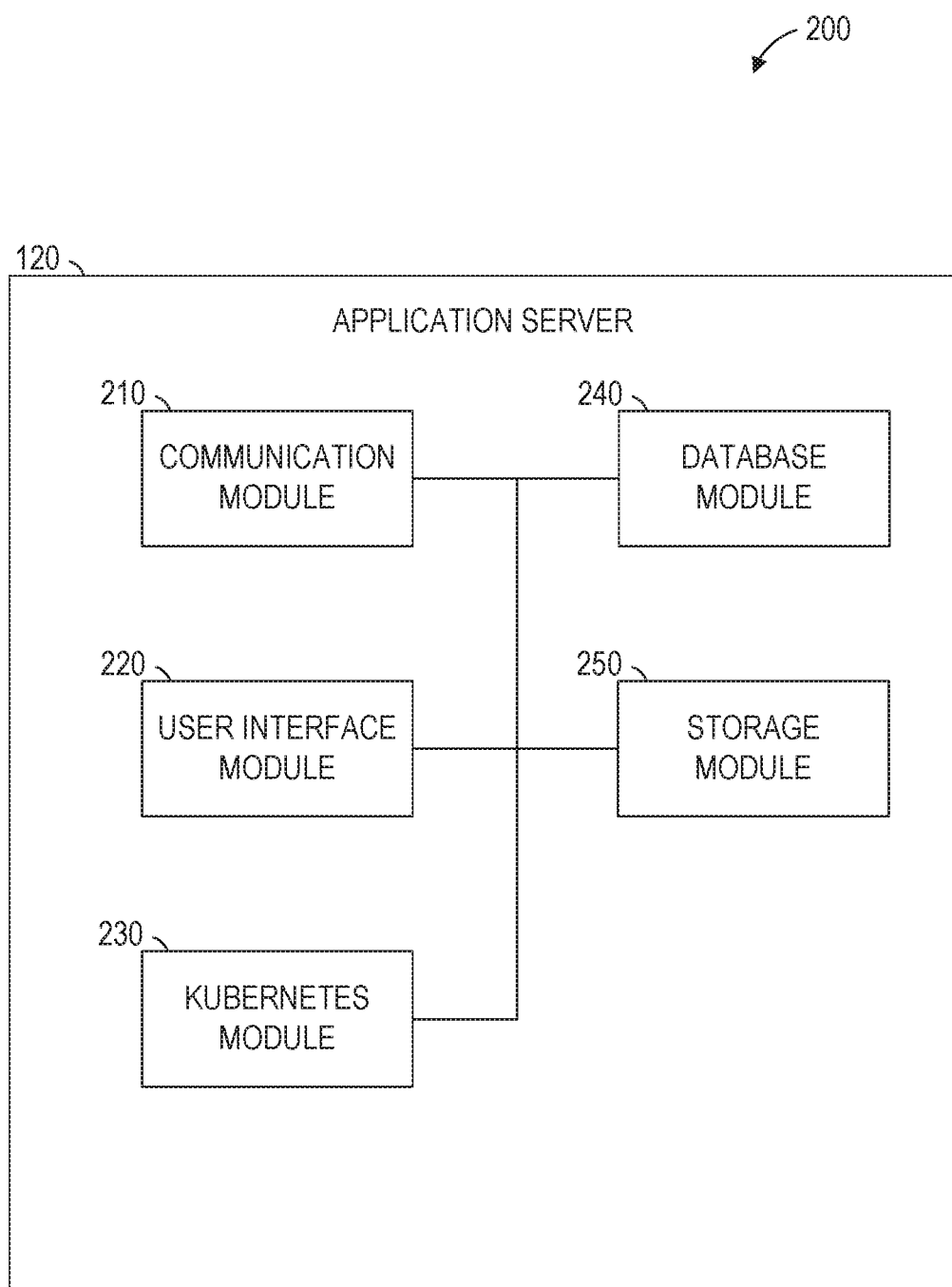
FIG. 2 is a block diagram of an application server, according to some example embodiments, suitable for using Kubernetes as a distributed operating system for a scalable application system.

FIG. 2 is a block diagram 200 illustrating components of the application server 110, according to some example embodiments. The application server 110 is shown as including a communication module 210, a user interface module 220, a Kubernetes module 230, a database module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the application server 110 and transmits data from the application server 110. For example, the communication module 210 may receive, from the client device 140A, data for a selected application. The communication module 210 provides the data to the Kubernetes module 230. The Kubernetes module 230 communicates with the Kubernetes API server 125 to cause one or more of the cluster nodes 130, via a virtual system application, to execute the application. The cluster nodes 130 executing the application communicate with the client device 140A via the network 155 to provide the selected application. In some example embodiments, data from a file is stored in a database via the database module 240 and the storage module 250. After being stored, the data may be accessed from the database. The communication module 210 may transmit a user interface from the user interface module 220 to the client device 140A that includes data for available applications. The list of available applications may be generated by accessing a manifest file that identifies the available applications; by accessing a directory that contains the files, in a standardized format, for the available applications; by accessing a table in a database that contains entries for the available applications; or any suitable combination thereof. Communications sent and received by the communication module 210 may be intermediated by the network 155.

The user interface module 220 causes presentation of a user interface for the application server 110 on a display associated with the client device 140A or 140B. The user interface allows a user to select an application from a list of applications, to interact with an application, or any suitable combination thereof.

Figure 3:
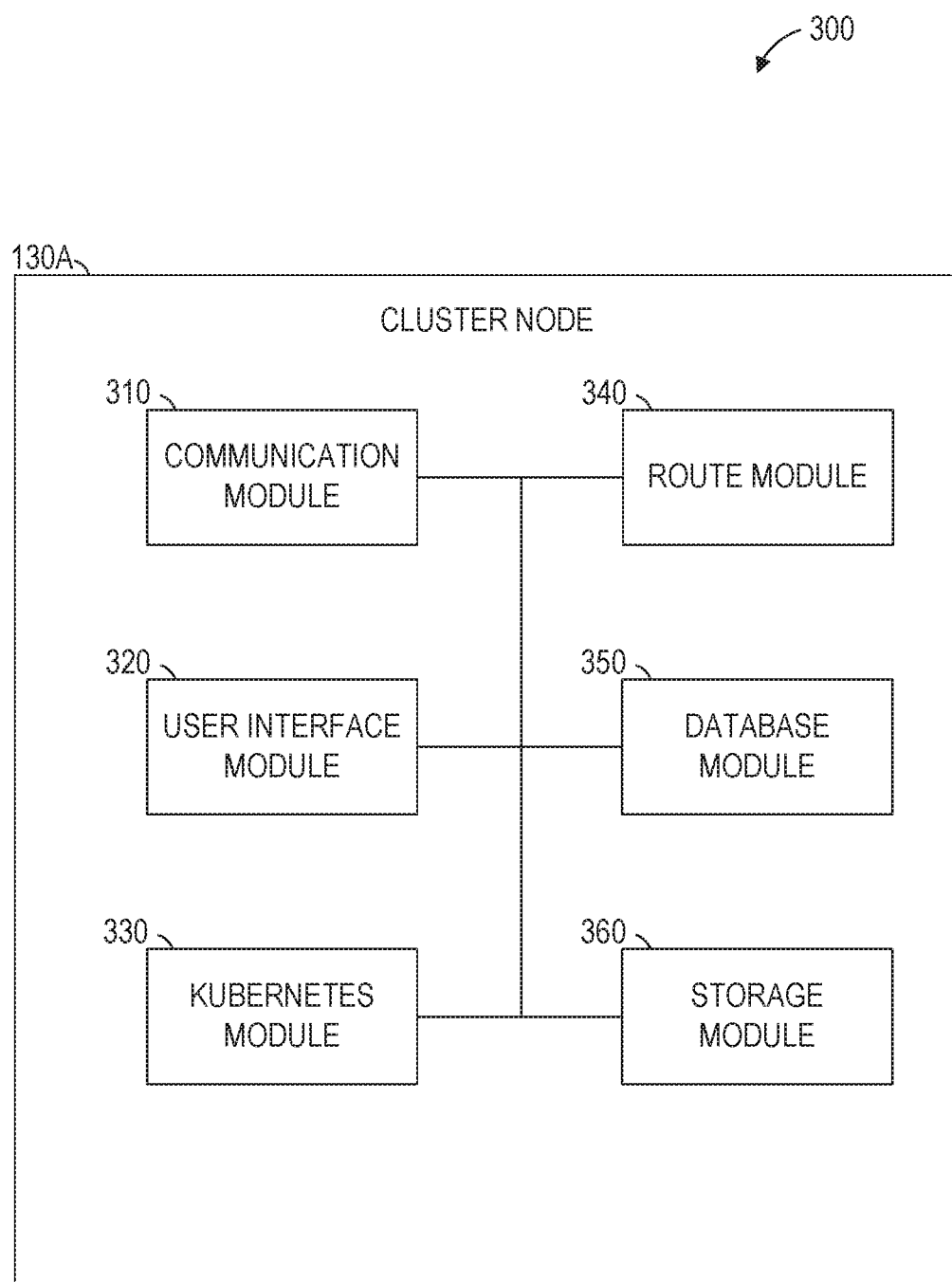
FIG. 3 is a block diagram of a cluster node, according to some example embodiments, suitable for using Kubernetes as a distributed operating system for a scalable application system.

FIG. 3 is a block diagram 300 illustrating components of the cluster node 130A, according to some example embodiments. The cluster node 130A is shown as including a communication module 310, a user interface module 320, a Kubernetes module 330, a route module 340, a database module 350, and a storage module 360, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 receives data sent to the cluster node 130A and transmits data from the cluster node 130A. For example, the communication module 310 may receive, from the Kubernetes API server 125, a request to use an application via a virtual system. The request may identify a user, a client device, a tenant, or any suitable combination thereof. The communication module 310 provides the data to the Kubernetes module 330. The route module 340, invoked by the Kubernetes module 330, determines which instance of the application to connect the client device to. The cluster node 130A, executing the instance of the application, communicates with the client device 140A via the network 155 to provide the application. In some example embodiments, data for the tenant is stored in a database via the database module 350 and the storage module 360. After being stored, the data may be accessed from the database. The communication module 310 may transmit a user interface from the user interface module 320 to the client device 140A that includes data for the application instance. Communications sent and received by the communication module 310 may be intermediated by the network 155.

The user interface module 320 causes presentation of a user interface for the cluster node 130A on a display associated with the client device 140A or 140B. The user interface allows a user to interact with the application instance.

Figure 4:
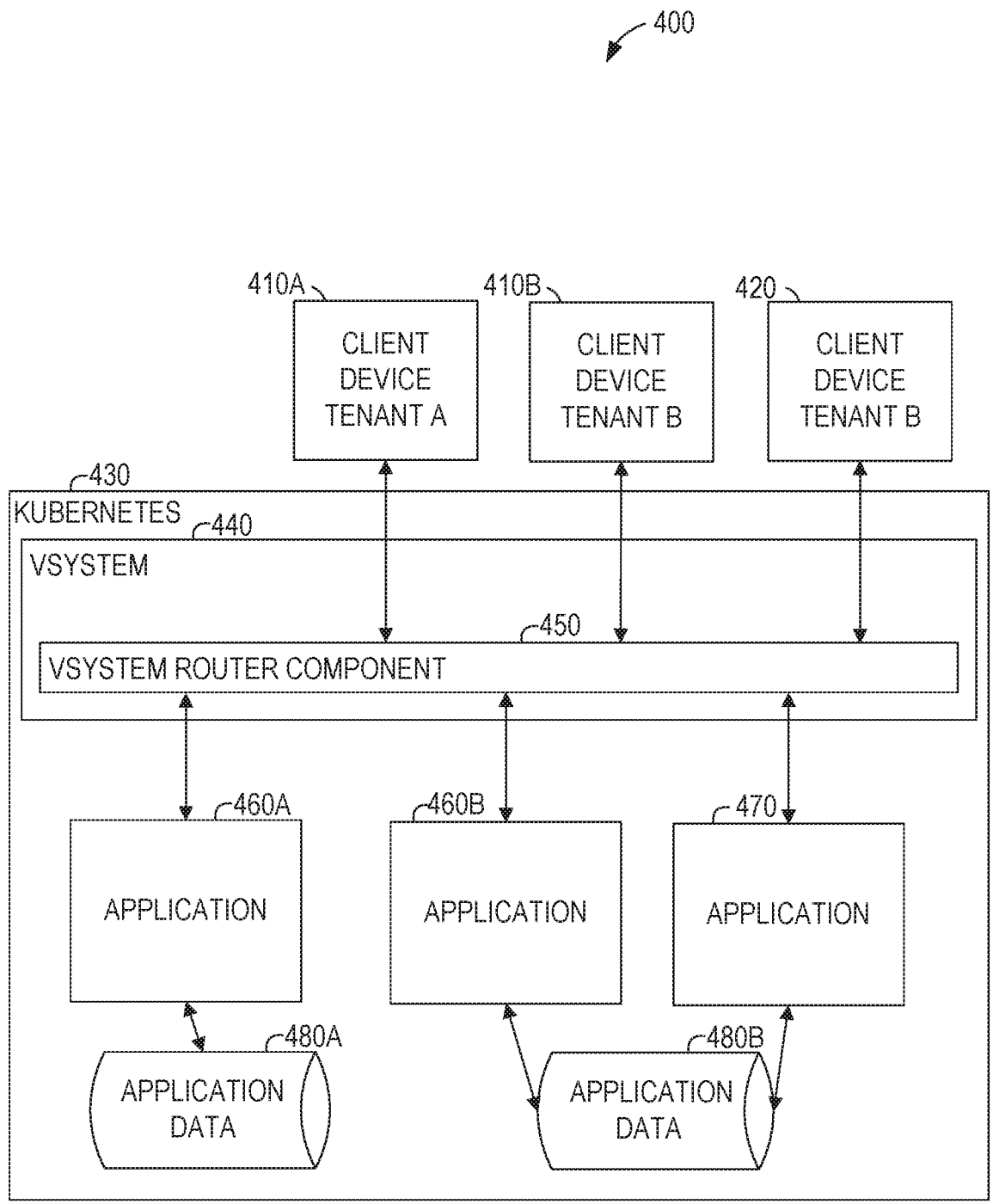
FIG. 4 is a block diagram of client devices in communication with a Kubernetes cluster acting as a distributed operating system that provides a multitenancy/multiuser environment, according to some example embodiments.

FIG. 4 is a block diagram 400 of client devices 410A, 410B, and 420 in communication with a Kubernetes cluster 430 acting as a distributed operating system that provides a multitenancy/multiuser environment, according to some example embodiments. The Kubernetes cluster 430 provides a Kubernetes virtual system ("vsystem") 440 application, application instances 460A, 460B, and 470, and data 480A and 480B. The data 480A may be stored in a first data store, and the data 480B may be stored in a separate second data store. A data store is a repository for persistently storing and managing data. Thus, separate data stores may be realized by using separate hardware devices or by using separate databases or other files to store the separate data stores.

Instead of directly requesting an application instance 460A, 460B, or 470 from the Kubernetes API server, the client devices 410A, 410B, and 420 invoke the vsystem 440. Based on information provided by the client device and the identity of the client device (e.g., unique identifying information for the client device stored in a cookie provided by the Kubernetes API server), a vsystem router component 450 routes the client to an appropriate application instance. In this example, the application instances are instances of Kubernetes containerized applications.

In some example embodiments, the request by each client device includes a uniform resource locator (URL) that identifies the application being requested. Thus, the request by the client device 410A and the request by the client device 410B may both use the same URL for the requested application but be routed to different instances of the application.

Though the example embodiment of FIG. 4 is described using the vsystem Kubernetes containerized application as a control application that controls the routing of the client devices to application instances, other types of control applications are possible. For example, the control application could execute outside of the Kubernetes environment and select the particular application instance to run within Kubernetes based on the identifier of the client device.

Figure 5:
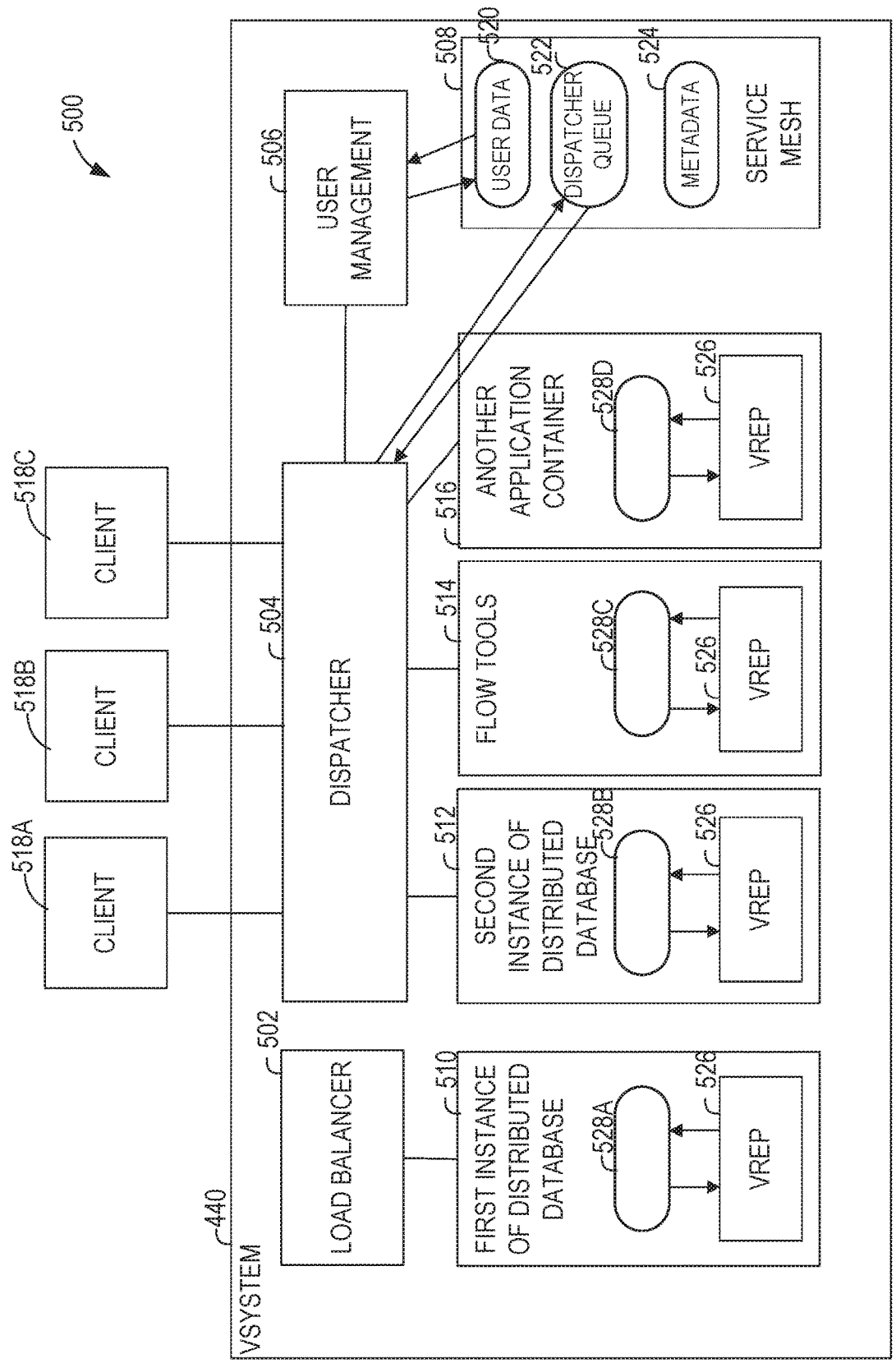
FIG. 5 is a block diagram of a vsystem, according to some example embodiments.

FIG. 5 is a block diagram 500 of a vsystem 440, according to some example embodiments. From the perspective of the Kubernetes cluster, the vsystem 440 is an ordinary Kubernetes application, and specifically a virtual system. The vsystem 440 may include a load balancer 502, a dispatcher 504, a user management component 506, a service mesh 508, a first instance of a distributed database 510, a second instance of the distributed database 512, flow tools 514, and another application container 516. The first instance of the distributed database 510, second instance of the distributed database 512, flow tools 514, and other application container 516 are all possible applications that may or may not be accessible to a client. The other application container 516 is intended to depict any other type of application that the vsystem 440 can be extended to accommodate. Access to one of these applications running in the vsystem 440, such as by clients 518A-518C, is controlled by the dispatcher 504. The clients 518A-518C make requests to the vsystem 440, which are passed through the dispatcher 504, which then decides which components or instances should handle each request. The user management component 506 aids the dispatcher 504 in making this determination. The service mesh 508 acts to store user data 520 such as access passwords, maintain a dispatcher queue 522 containing operations ordered by the dispatcher 504, and maintain metadata 524 for a virtual repository (vRep) 526, which is a distributed file system divided by user. The vRep 526 may be maintained within each of the applications 510-516, and each instance of the vRep may contain its own different top layer 528A-528D, which is unique for each user. This allows application data to be isolated based on users. The users can access files directly in their corresponding top layers 530A-530D, and each of these top layers can also be used by the vsystem 440 itself to determine which applications to access for which users and other configuration files. The vsystem 440 starts and stops the applications as needed. An application can run isolated for each user and/or can comprise different pods. Thus, it is appropriate for stateful applications as well as for stateless applications (microservices). Applications are scaled by the vsystem 440, and the application versions used are controlled (via the vRep 526) by the vsystem 440.

After a client 518A-518C is connected to a particular vsystem application instance, communications between the client device and the destination application instance may be intermediated by the vsystem application instance. Alternatively, the client device may be redirected to the destination application instance by the vsystem, so that further communications between the destination application instance and the client device are direct.

In another example embodiment, an ABAP application server is run as its own vsystem application 440 within the vsystem 440 architecture. Like the other vsystem applications 510-516, it also contains a vRep 526 instance and its own top layer 520B. The ABAP application server supports exposing programs executed inside of it in many different communication formats, such as Remote Function Calls (RFCs), REST APIs (via SCIF transactions), SOAP, and web sockets (using ABAP channels). First an ABAP program is created, and then this ABAP program is modified to be executable inside the vsystem 440. This involves making the appropriate calls based on the underlying communication format desired, inside the vsystem 440 application server, which executes the corresponding ABAP program. For example, in a web sockets environment, a web browser can initiate a StartGraph( ) call to the vsystem 440, which then can forward this StartGraph( ) to a pipeline modeler. The pipeline modeler may then issue an RPC or web sockets call to the application server.

One advantage of running an ABAP application server within the vsystem 440 is that it can be located "near" (from a network perspective) the other vsystem 440 applications without a noteworthy performance drawback for the ABAP system itself. Due to the extremely optimized caching algorithms of ABAP application servers, the database server is only called for non-cached database operations. ABAP programs are executed on the "local" ABAP application server and communicate directly with the vsystem 440. This can be used, for example, for reusing the user management of ABAP in the vsystem 440 (and therefore forming one combined system).

Figure 6:
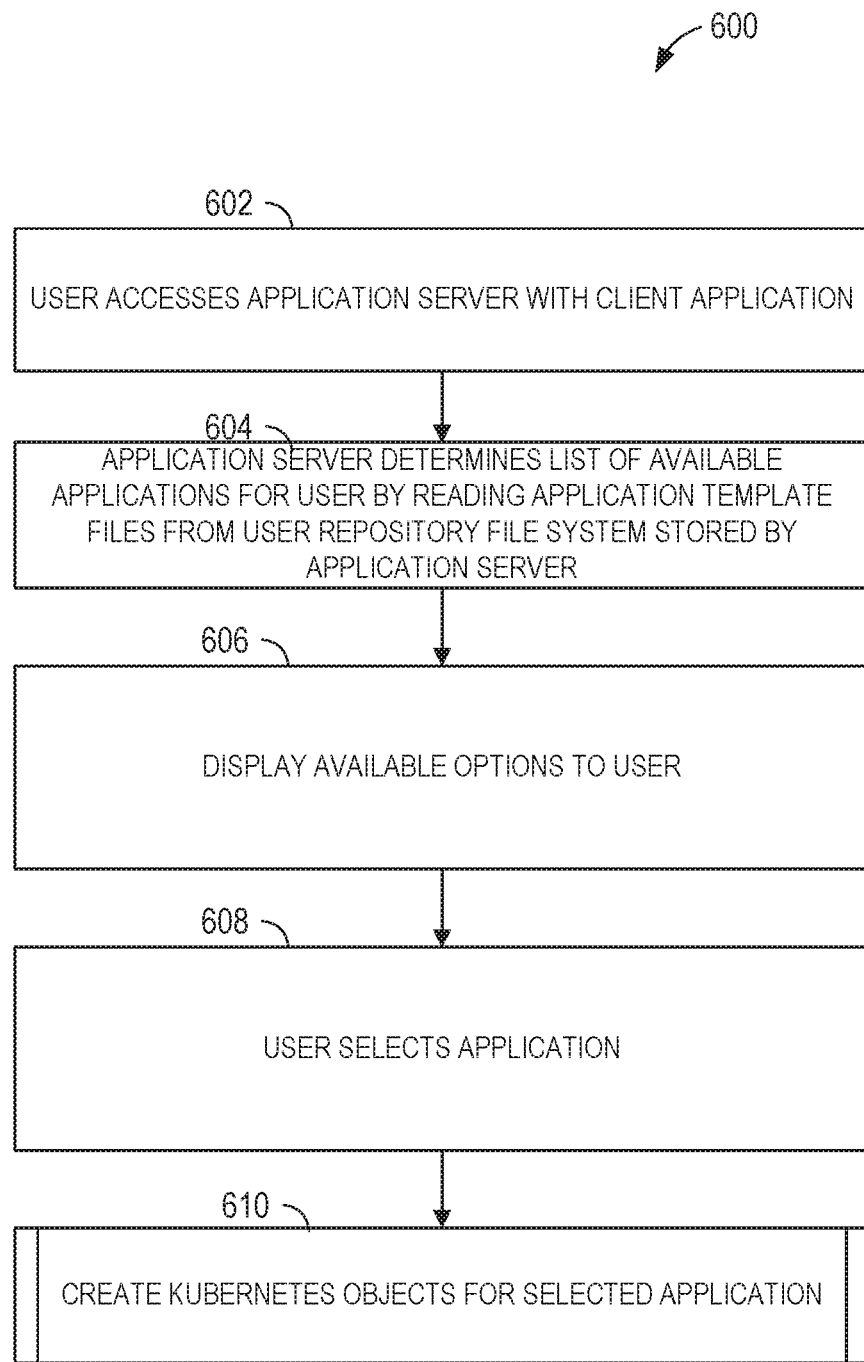
FIG. 6 is a flowchart illustrating operations of a method suitable for using a vsystem to start an application via an abstraction layer, in accordance with an example embodiment.

FIG. 6 is a flowchart illustrating operations of a method 600 suitable for using a vsystem, such as the vsystem 440, to start an application via an abstraction layer, in accordance with an example embodiment. At operation 602, a user accesses an application server with a client application. In an example embodiment, the client application may be a web browser. At operation 604, the application server determines a list of available applications for the user by reading application template files from a user repository file system stored by the application server. At operation 606, the available options for applications are displayed to the user via the client application.

At operation 608, the user selects an application from the available options, via interaction with the client application, such as by selecting an application via a graphical user interface. At operation 610, the application server creates the required Kubernetes objects for the selected application. Multiple application types are supported. Each application type comprises different Kubernetes objects working together. The application server is extensible and allows the inclusion of new application types. The application server may be, for example, the application server 110 of FIG. 1.

Figure 7:
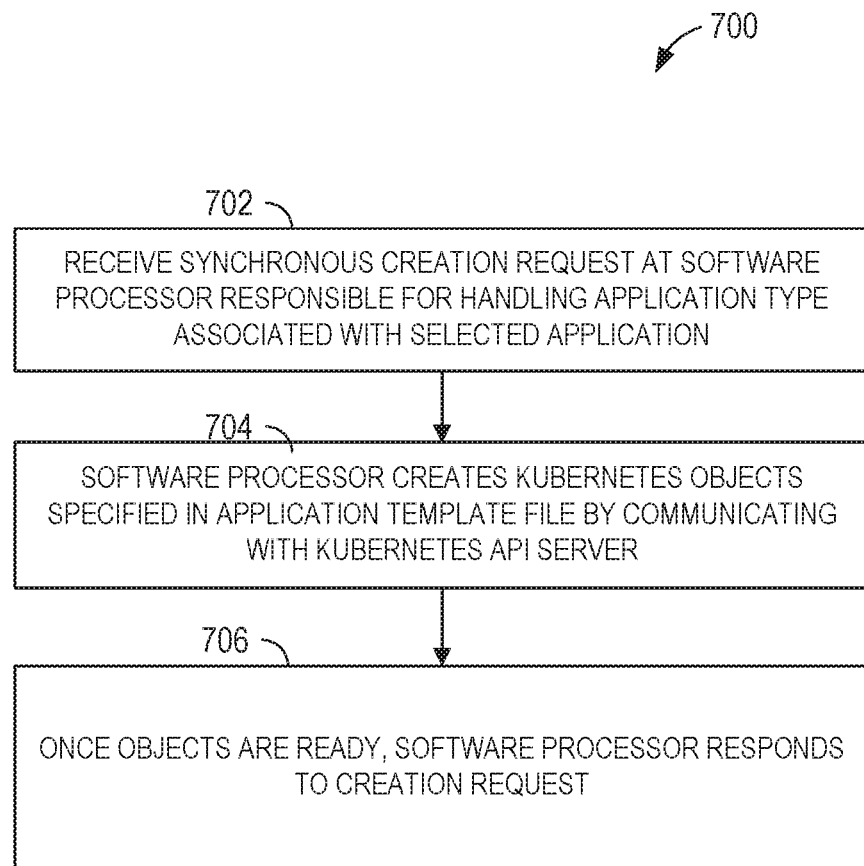
FIG. 7 is a flowchart illustrating operations of a method suitable for creating required Kubernetes objects, in accordance with an example embodiment.

FIG. 7 is a flowchart illustrating operations of a method 700 suitable for creating required Kubernetes objects, in accordance with an example embodiment. Specifically, the method 700 may be performed at operation 610 of FIG. 6. At operation 702, a synchronous creation request is received at a software processor responsible for handling an application type associated with a selected application, from the application server. At operation 704, the software processor creates the Kubernetes objects specified in the application template file by communicating with the Kubernetes API server. At operation 706, once the objects are ready, the software processor responds to the creation request. This response may include the hostname and port at which the application is available. Thus, once the Kubernetes objects are ready, the client application of the user is redirected to the application. In some example embodiments, the hostname corresponds to a Kubernetes service.

Figure 8:
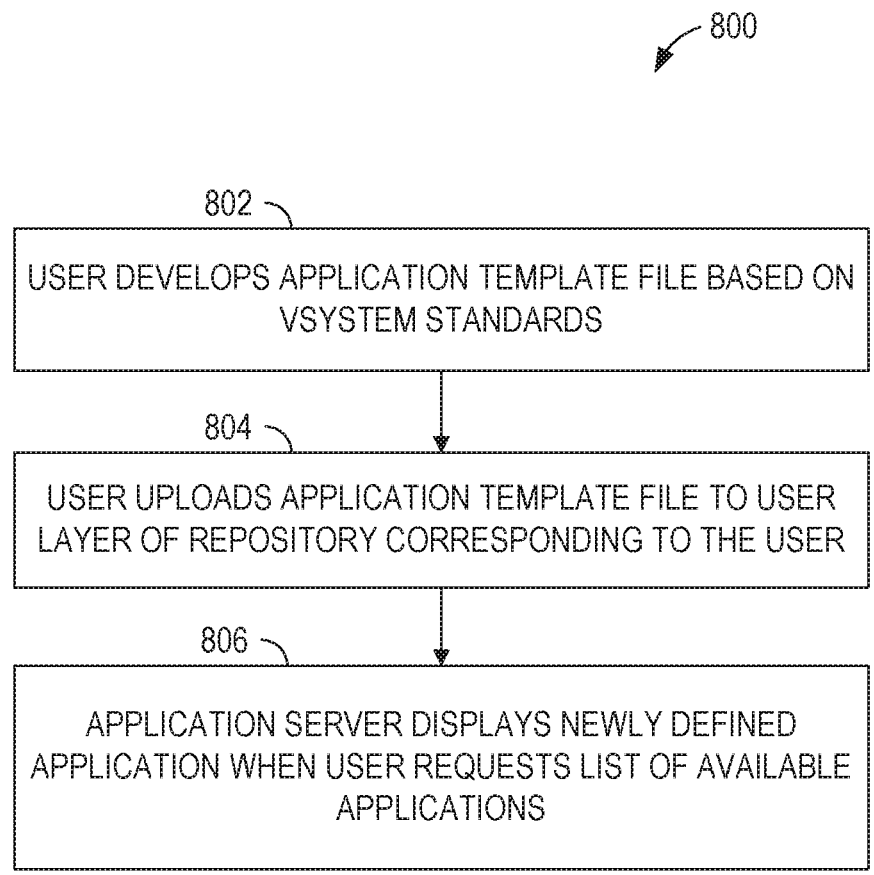
FIG. 8 is a flowchart illustrating operations of a method suitable for defining a new application using a vsystem, in accordance with an example embodiment.

FIG. 8 is a flowchart illustrating operations of a method 800 suitable for defining a new application using a vsystem, in accordance with an example embodiment. At operation 802, a user develops an application template file based on vsystem standards. At operation 804, the user uploads the application template file to a user layer of a repository corresponding to the user on the application server, through a command-line tool or through the application server user interface on a browser. At operation 806, the application server displays the newly defined application when the user requests a list of available applications. The new application is only available to the user who defined it, unless and until the user makes the new application available to other users.

Figure 9:
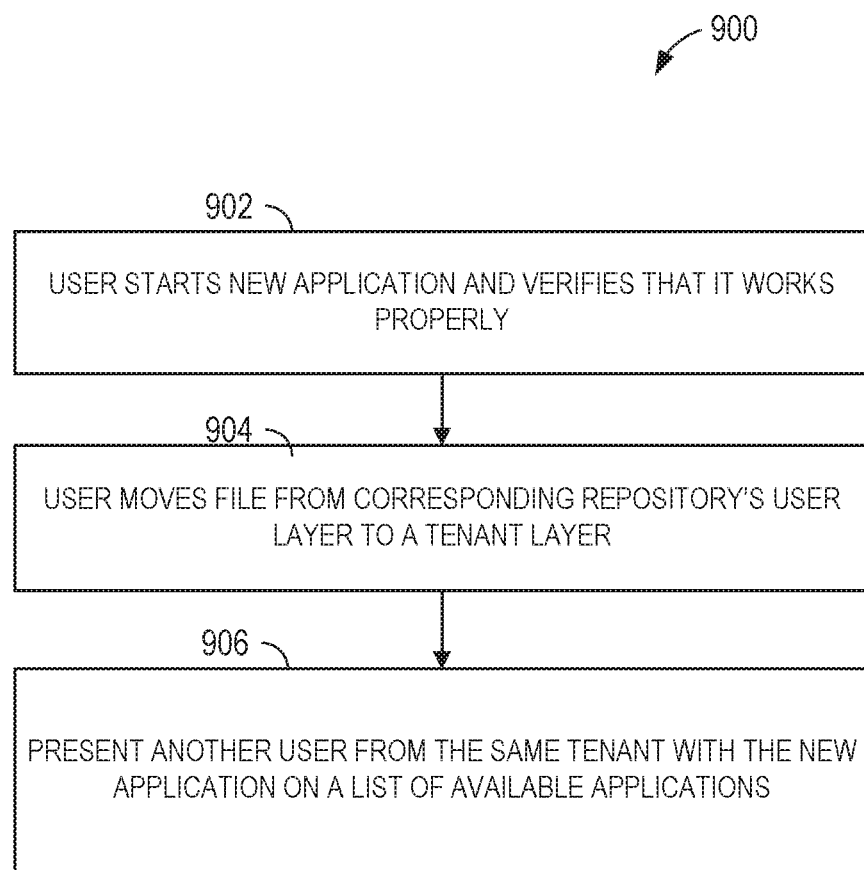
FIG. 9 is a flowchart illustrating operations of a method suitable for making a new application available to other users, in accordance with an example embodiment.

FIG. 9 is a flowchart illustrating operations of a method 900 suitable for making a new application available to other users, in accordance with an example embodiment. The method 900 may be deployed on any of the hardware described herein. As shown at operation 902, the user starts the new application and verifies that it operates within parameters defined by the user. Thereafter, at operation 904, the user moves the file from his or her corresponding repository's user layer to a tenant layer in the vsystem. At operation 906, another user from the same tenant can now be presented with the new application on a list of available applications.

Figure 10:
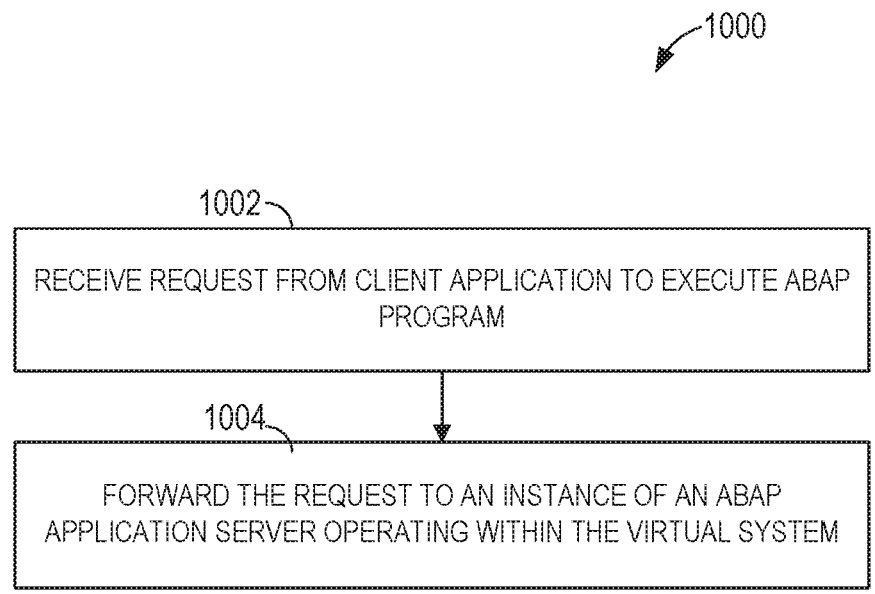
FIG. 10 is a flowchart illustrating operations of a method suitable for operating an ABAP application server within a vsystem, in accordance with an example embodiment.

FIG. 10 is a flowchart illustrating operations of a method 1000 suitable for operating an ABAP application server within a vsystem, in accordance with an example embodiment. At operation 1002, a request from a client application to execute an ABAP program within a virtual system is received. At operation 1004, the request is forwarded to an instance of an ABAP application server operating within the virtual system (such as the vsystem 440), the instance containing a virtual repository and top layer, the top layer being unique to a user who initiated the request, causing the ABAP application server to execute the ABAP program.

Figure 11:
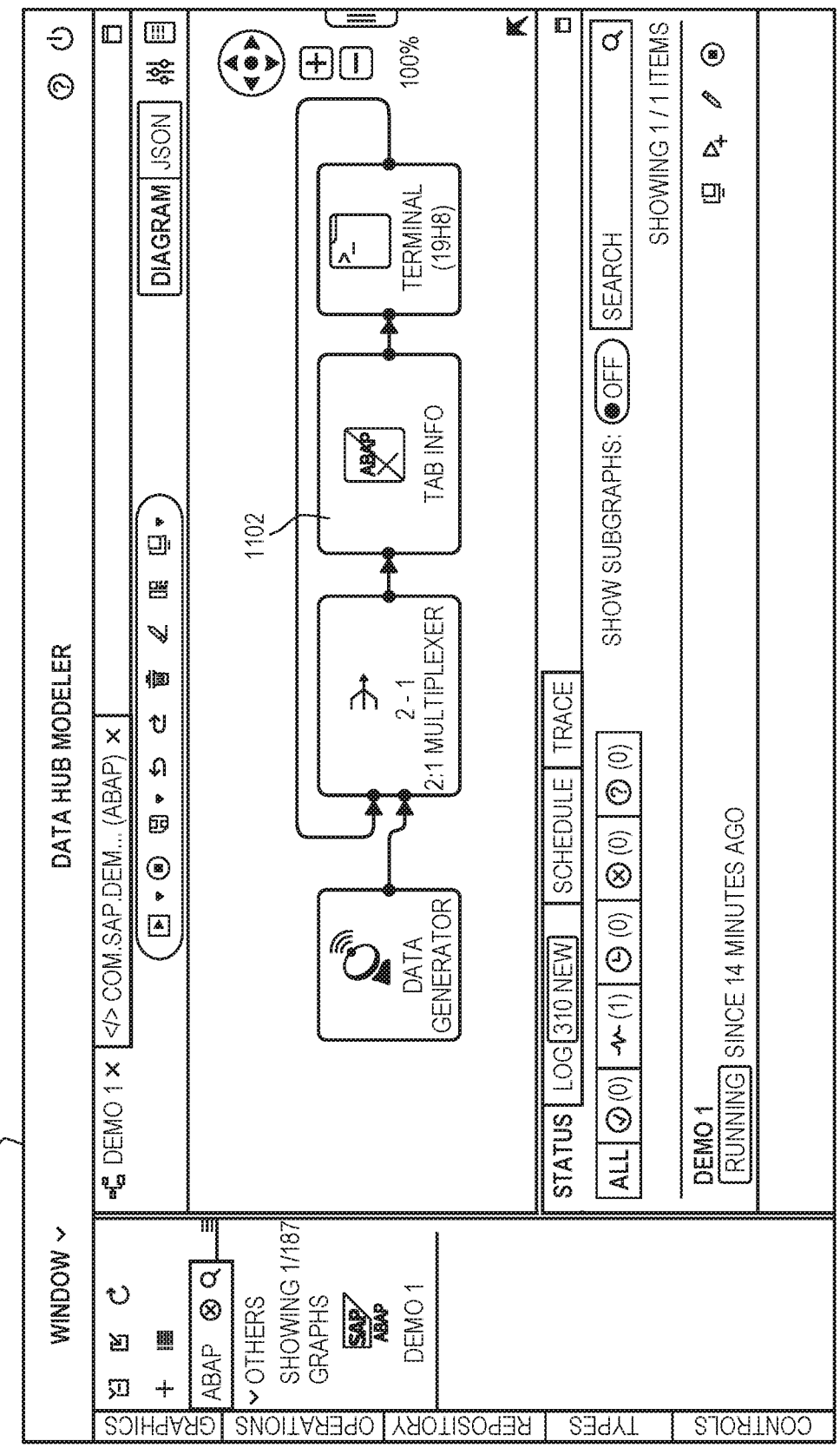
FIG. 11 is a diagram illustrating a pipeline application running as an application within a vsystem, in accordance with an example embodiment.

FIG. 11 is a diagram illustrating a pipeline application 1100 running as an application within a vsystem. It is communicating directly with an ABAP application server also running in the vsystem using an ABAP operator "Tab Info" 1102.

Figure 12:
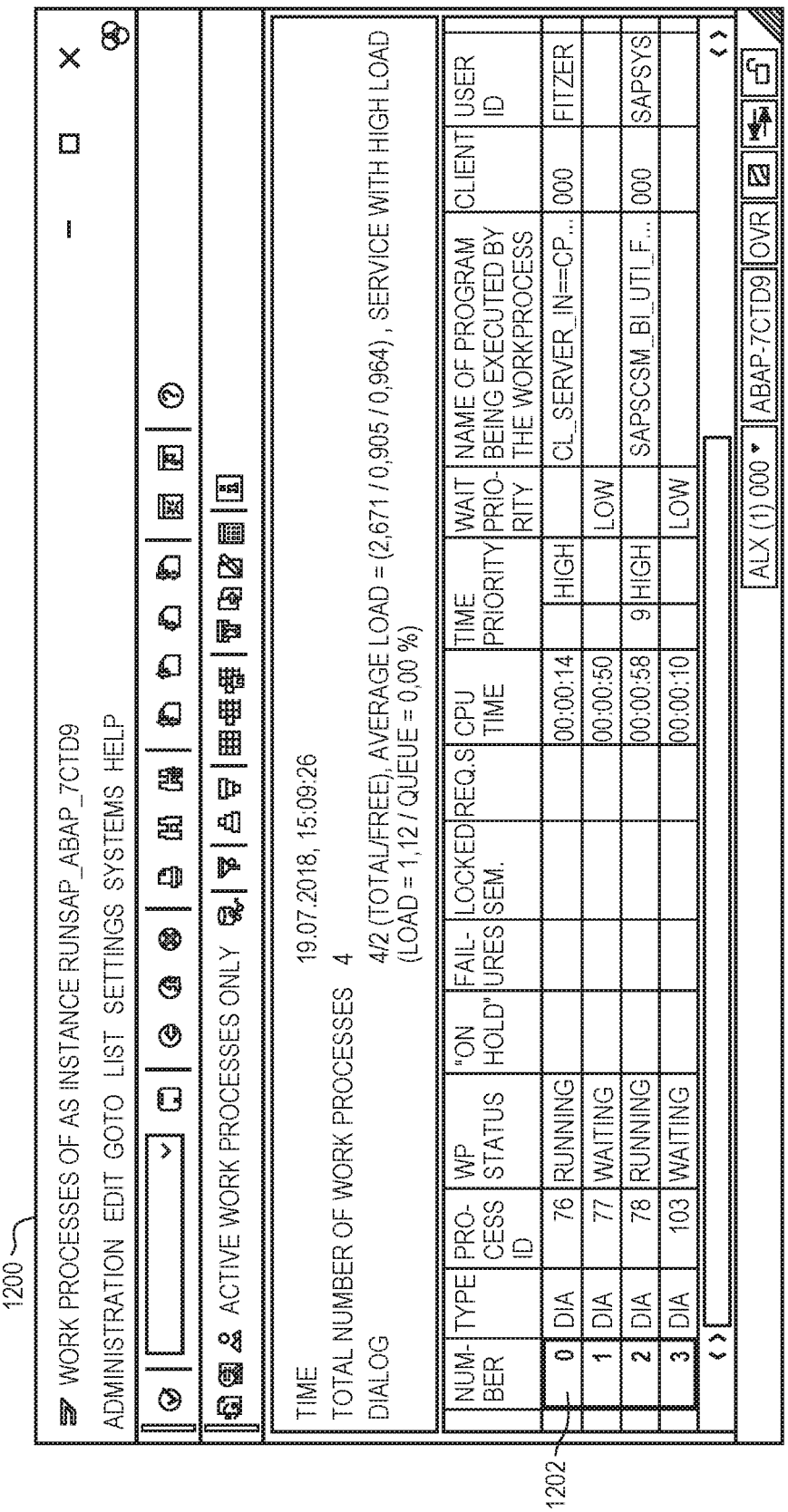
FIG. 12 is a screen diagram illustrating a graphical user interface connected via a gateway to the ABAP application server running within the vsystem, in accordance with an example embodiment.

FIG. 12 is a screen diagram illustrating a graphical user interface 1200 connected via a gateway to the ABAP application server running within the vsystem. A first entry 1202 depicts the dialog process communicating with the running pipeline.

EXAMPLES

Example 1. A system comprising:
at least one hardware processor; and
a computer-readable medium storing instructions that, when executed by the at least one hardware processor, cause the at least one hardware processor to perform operations comprising:
receiving, via network, a request from a client application to execute a software program within a virtual system, the request being associated with a user credential; and
forwarding the request to an instance of an application server operating within the virtual system, the instance containing a virtual repository and a top layer, the top layer being unique to the user credential, causing the application server to execute the software program.

Example 2. The system of Example 1, wherein the application has a corresponding application template file.

Example 3. The system of Examples 1 or 2, wherein the operations further comprise:
receiving a request from a client application to view applications available to be run by the user of the client application;
retrieving one or more application template files stored in a repository file system corresponding to the user credential;
based on the retrieved one or more application template files, identifying a list of available applications to be run by a user associated with the user credential;
receiving, from the client application, a selection of one of the applications available to be run by the user;
identifying an application type for the selected application by parsing an application template file corresponding to the selected application; and
creating a synchronous creation request to a software processor responsible for handling the identified application type, causing the software processor to create one or more objects specified in the application template file corresponding to the selected application.

Example 4. The system of any of Examples 1-3, wherein one or more objects specified in an application template file corresponding to the application server are created by communicating with a Kubernetes API server.

Example 5. The system of Example 4, wherein the one or more objects specified in the application template file corresponding to the application server are one or more Kubernetes objects.

Example 6. The system of any of Examples 1-5, wherein the application server is a Kubernetes containerized application.

Example 7. The system of Example 3, wherein each of the applications available to be run by the user is a containerized application containing a copy of a virtual repository for the user and data that is specific to both the application and the user.

Example 8. A method comprising:
receiving, via network, a request from a client application to execute a software program within a virtual system, the request being associated with a user credential; and
forwarding the request to an instance of an application server operating within the virtual system, the instance containing a virtual repository and a top layer, the top layer being unique to the user credential, causing the application server to execute the software program.

Example 9. The method of Example 8, wherein the application server has a corresponding application template file.

Example 10. The method of Examples 8 or 9, further comprising:
receiving a request from a client application to view applications available to be run by the user of the client application;
retrieving one or more application template files stored in a repository file system corresponding to the user credential;
based on the retrieved one or more application template files, identifying a list of available applications to be run by a user associated with the user credential;
receiving, from the client application, a selection of one of the applications available to be run by the user;
identifying an application type for the selected application by parsing an application template file corresponding to the selected application; and
creating a synchronous creation request to a software processor responsible for handling the identified application type, causing the software processor to create one or more objects specified in the application template file corresponding to the selected application.

Example 11. The method of any of Examples 8-10, wherein one or more objects specified in an application template file corresponding to the application server are created by communicating with a Kubernetes API server.

Example 12. The method of Example 11, wherein the one or more objects specified in the application template file corresponding to the application server are one or more Kubernetes objects.

Example 13. The method of any of Examples 8-12, wherein the application server is a Kubernetes containerized application.

Example 14. The method of Example 10, wherein each of the applications available to be run by the user is a containerized application containing a copy of a virtual repository for the user and data that is specific to both the application and the user.

Example 15. A non-transitory computer-readable medium that stores instructions that, when executed by one or more processors, cause the one or more processors to perform operations comprising:
receiving, via network, a request from a client application to execute a software program within a virtual system, the request being associated with a user credential; and
forwarding the request to an instance of an application server operating within the virtual system, the instance containing a virtual repository and a top layer, the top layer being unique to the user credential, causing the application server to execute the software program.

Example 16. The computer-readable medium of Example 15, wherein the application server has a corresponding application template file.

Example 17. The computer-readable medium of Examples 15 or 16, wherein the operations further comprise:
receiving a request from a client application to view applications available to be run by the user of the client application;
retrieving one or more application template files stored in a repository file system corresponding to the user credential;
based on the retrieved one or more application template files, identifying a list of available applications to be run by a user associated with the user credential;
receiving, from the client application, a selection of one of the applications available to be run by the user;
identifying an application type for the selected application by parsing an application template file corresponding to the selected application; and
creating a synchronous creation request to a software processor responsible for handling the identified application type, causing the software processor to create one or more objects specified in the application template file corresponding to the selected application.

Example 18. The computer-readable medium of any of Examples 15-17, wherein one or more objects specified in an application template file corresponding to the application server are created by communicating with a Kubernetes API server.

Example 19. The computer-readable medium of Example 18, wherein the one or more objects specified in the application template file corresponding to the application server are one or more Kubernetes objects.

Example 20. The computer-readable medium of any of Examples 15-19, wherein the application server is a Kubernetes containerized application.

Figure 13:
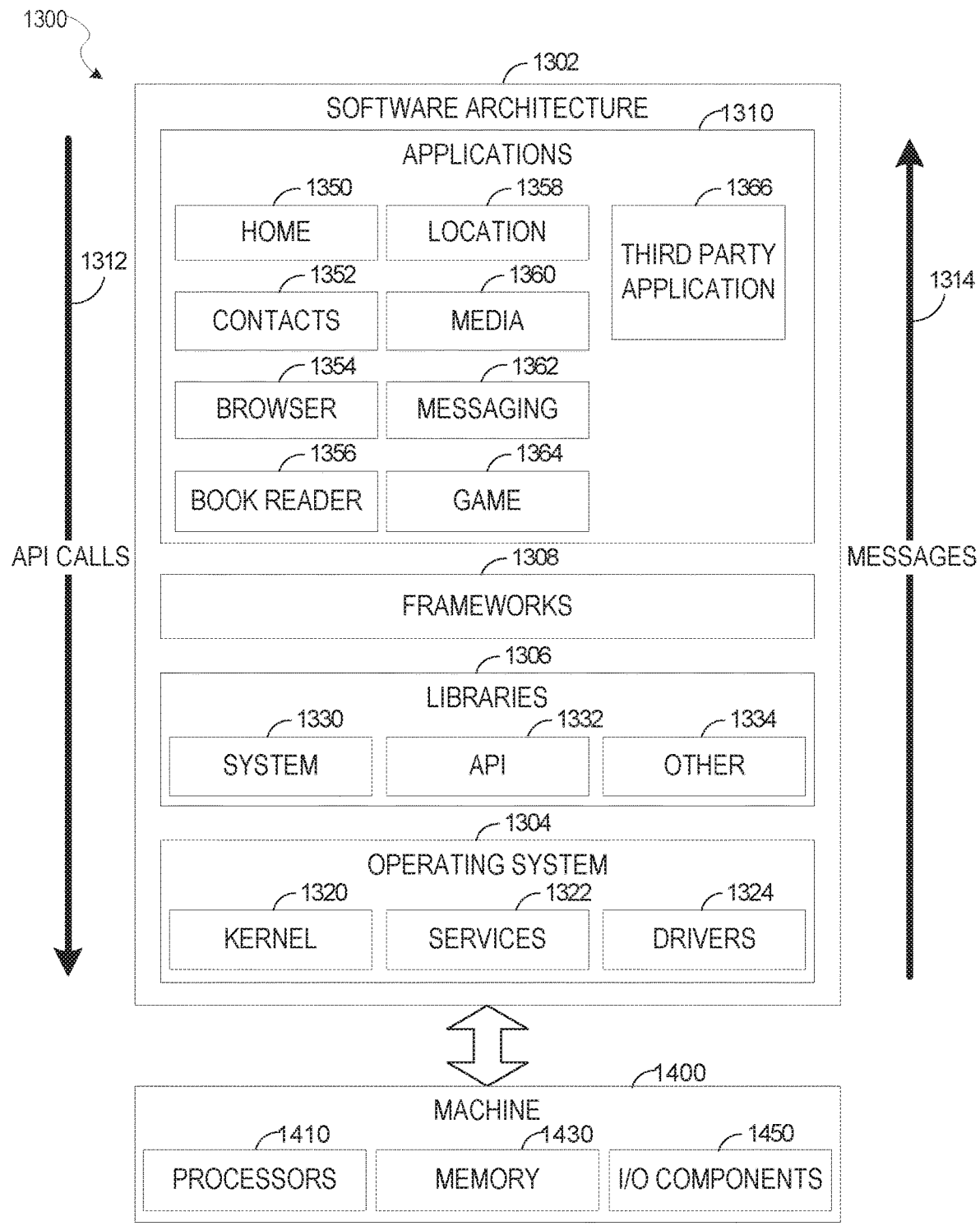
FIG. 13 is a block diagram illustrating an architecture of software, which can be installed on any one or more of the devices described above.

FIG. 13 is a block diagram 1300 illustrating an architecture of software 1302, which can be installed on any one or more of the devices described above. FIG. 13 is merely a non-limiting example of a software architecture, and it will be appreciated that many other architectures can be implemented to facilitate the functionality described herein. In various embodiments, the software 1302 is implemented by hardware such as a machine 1400 of FIG. 14 that includes processors 1410, memory 1430, and input/output (I/O) components 1450. In this example architecture, the software 1302 can be conceptualized as a stack of layers where each layer may provide a particular functionality. For example, the software 1302 includes layers such as an operating system 1304, libraries 1306, frameworks 1308, and applications 1310. Operationally, the applications 1310 invoke API calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphical user interface (GUI) functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications, such as a third-party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1366 can invoke the API calls 1312 provided by the operating system 1304 to facilitate functionality described herein.

Figure 14:
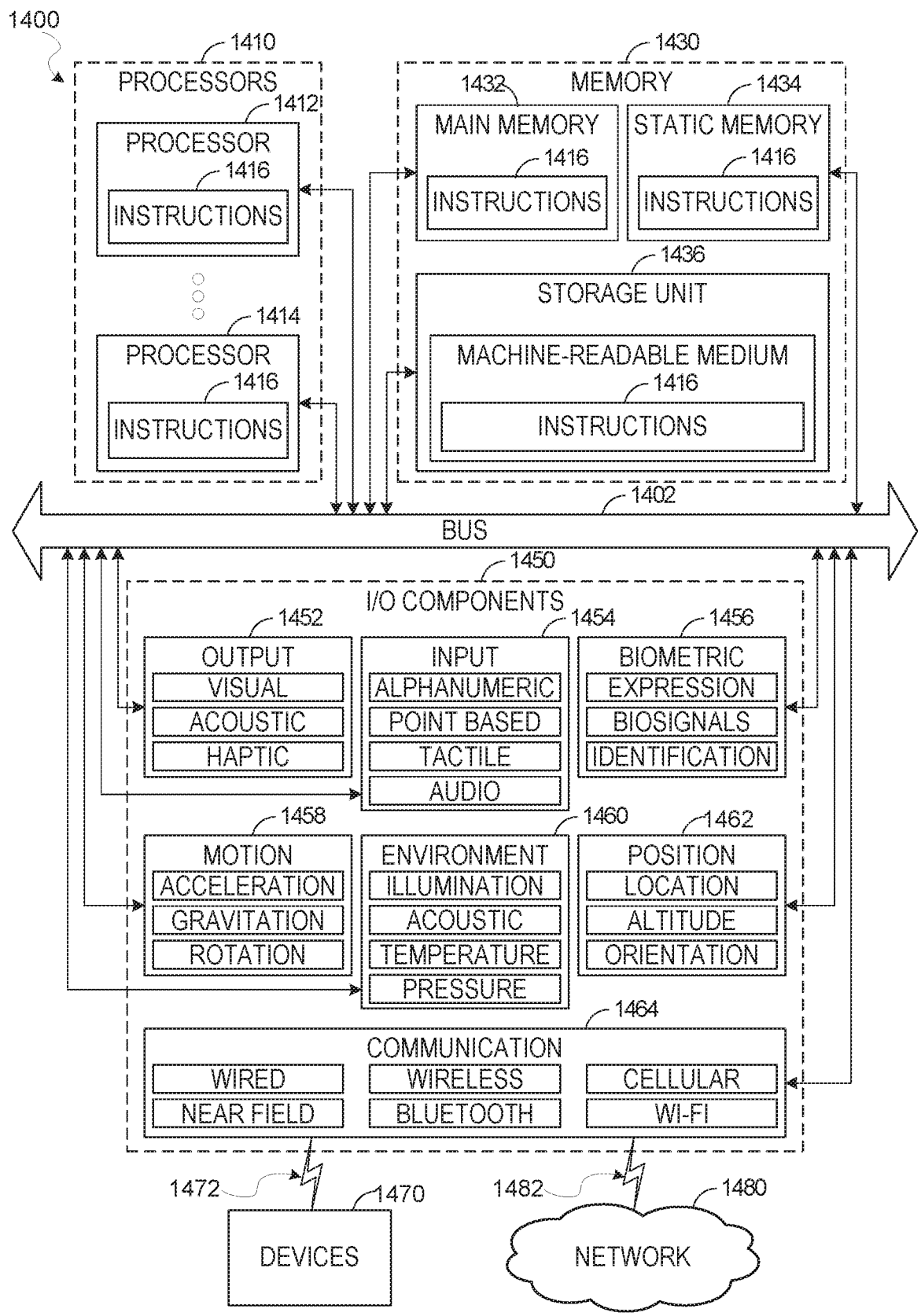
FIG. 14 illustrates a diagrammatic representation of a machine in the form of a computer system within which a set of instructions may be executed for causing the machine to perform any one or more of the methodologies discussed herein, according to an example embodiment.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute the method 600 of FIG. 6, the method 700 of FIG. 7, the method 800 of FIG. 8, the method 900 of FIG. 9, or the method 1000 of FIG. 10. Additionally, or alternatively, the instructions 1416 may implement FIGS. 1-12 and so forth. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions 1416 contemporaneously. Although FIG. 14 shows multiple processors 1410, the machine 1400 may include a single processor 1412 with a single core, a single processor 1412 with multiple cores (e.g., a multi-core processor 1412), multiple processors 1412, 1414 with a single core, multiple processors 1412, 1414 with multiple cores, or any combination thereof.

The memory 1430 may include a main memory 1432, a static memory 1434, and a storage unit 1436, each accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The IO components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., by voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components e.g., one or more thermometers that detect ambient temperature), humidity sensor components, pressure sensor components (e.g., barometer), acoustic sensor components (e.g., one or more microphones that detect background noise), proximity sensor components e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., coupled via a USB).

Moreover, the communication components 1464 may detect identifiers or include components operable to detect identifiers. For example, the communication components 1464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

The various memories (i.e., 1430, 1432, 1434, and/or memory of the processor(s) 1410) and/or the storage unit 1436 may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a computer-readable medium storing instructions that, when executed by the at least one hardware processor, cause the at least one hardware processor to perform operations comprising:
    receiving, via network, a request from a client application to execute a application language-based software program within a virtual system, the request being associated with a user credential; and
    forwarding the request to an instance of an application language application server, designed to receive commands in the application language and supporting exposing software programs in a plurality of different communication formats other than the application language, operating within the virtual system, the instance containing a virtual repository and a top layer, the top layer being unique to the user credential, causing the application language application server to execute the software program, wherein the application language application server has a corresponding Kubernetes virtual system application template file.

2. The system of claim 1, wherein the operations further comprise:
    receiving a request from a client application to view application language-based applications available to be run by the user of the client application;
    retrieving one or more application template files stored in a repository file system corresponding to the user credential;
    based on the retrieved one or more application template files, identifying a list of available application language-based applications to be run by a user associated with the user credential;
    receiving, from the client application, a selection of one of the application language-based applications available to be run by the user;
    identifying an application type for the selected application language-based application by parsing an application template file corresponding to the selected application language-based application; and creating a synchronous creation request to a software processor responsible for handling the identified application type, causing the software processor to create one or more objects specified in the application template file corresponding to the selected application language-based application.

3. The system of claim 1, wherein one or more objects specified in an application template file corresponding to the application language application server are created by communicating with a Kubernetes API server.

4. The system of claim 3, wherein the one or more objects specified in the application template file corresponding to the application language application server are one or more Kubernetes objects.

5. The system of claim 1, wherein the application language application server is a Kubernetes containerized application.

6. The system of claim 2, wherein each of the application language-based applications available to be run by the user is a containerized application containing a copy of a virtual repository for the user and data that is specific to both the application language-based application and the user.

7. A method comprising:
receiving, via network, a request from a client application to execute a application language-based software program within a virtual system, the request being associated with a user credential; and
forwarding the request to an instance of an application language application server, designed to receive commands in the application language and supporting exposing software programs in a plurality of different communication formats other than the application language, operating within the virtual system, the instance containing a virtual repository and a top layer, the top layer being unique to the user credential, causing the application language application server to execute the software program, wherein the application language application server has a corresponding Kubernetes virtual system application template file.

8. The method of claim 7, further comprising:
receiving a request from a client application to view application language-based applications available to be run by the user of the client application;
retrieving one or more application template files stored in a repository file system corresponding to the user credential;
based on the retrieved one or more application template files, identifying a list of available application language-based applications to be run by a user associated with the user credential;
receiving, from the client application, a selection of one of the application language-based applications available to be run by the user;
identifying an application type for the selected application language-based application by parsing an application template file corresponding to the selected application language-based application; and
creating a synchronous creation request to a software processor responsible for handling the identified application type, causing the software processor to create one or more objects specified in the application template file corresponding to the selected application language-based application.

9. The method of claim 7, wherein one or more objects specified in an application template file corresponding to the application language application server are created by communicating with a Kubernetes API server.

10. The method of claim 9, wherein the one or more objects specified in the application template file corresponding to the application language application server are one or more Kubernetes objects.

11. The method of claim 7, wherein the application language application server is a Kubernetes containerized application.

12. The method of claim 8, wherein each of the application language-based applications available to be run by the user is a containerized application containing a copy of a virtual repository for the user and data that is specific to both the application language-based application and the user.

13. A non-transitory computer-readable medium that stores instructions that, when executed by one or more processors, cause the one or more processors to perform operations comprising:
receiving, via network, a request from a client application to execute a application language-based software program within a virtual system, the request being associated with a user credential; and
forwarding the request to an instance of an application language application server, designed to receive commands in the application language and supporting exposing software programs in a plurality of different communication formats other than the application language, operating within the virtual system, the instance containing a virtual repository and a top layer, the top layer being unique to the user credential, causing the application language application server to execute the software program, wherein the application language application server has a corresponding Kubernetes virtual system application template rile.

14. The computer-readable medium of claim 13, wherein the operations further comprise:
receiving a request from a client application to view application language-based applications available to be run by the user of the client application;
retrieving one or more application template files stored in a repository file system corresponding to the user credential;
based on the retrieved one or more application template files, identifying a list of available application language-based applications to be run by a user associated with the user credential;
receiving, from the client application, a selection of one of the application language-based applications available to be run by the user;
identifying an application type for the selected application language-based application by parsing an application template file corresponding to the selected application language-based application; and
creating a synchronous creation request to a software processor responsible for handling the identified application type, causing the software processor to create one or more objects specified in the application template file corresponding to the selected application language-based application.

15. The computer-readable medium of claim 13, wherein one or more objects specified in an application template file corresponding to the application language application server are created by communicating with a Kubernetes API server.

16. The computer-readable medium of claim 15, wherein the one or more objects specified in the application template file corresponding to the application language application server are one or more Kubernetes objects.

17. The computer-readable medium of claim 13, wherein the application language application server is a Kubernetes containerized application.

\* \* \* \* \*